United States Patent [19]

Pfleiderer

[11] Patent Number: 5,743,928
[45] Date of Patent: Apr. 28, 1998

[54] METHOD AND APPARATUS FOR EXTRUDING GLASS TUBING

[76] Inventor: Larry Pfleiderer, 35 Tamarack Rd., Rocky Point, N.Y. 11778

[21] Appl. No.: 767,184

[22] Filed: Dec. 16, 1996

[51] Int. Cl.$^6$ ................................................ C03B 17/00
[52] U.S. Cl. ............... 65/83; 65/84; 65/86; 65/183; 425/72.1; 425/378.1; 425/380
[58] Field of Search ....................... 65/83, 84, 86, 65/183; 264/177.11, 177.14, 177.15, 177.19, 237; 425/72.1, 378.1, 380

[56] References Cited

U.S. PATENT DOCUMENTS

| | | | |
|---|---|---|---|
| 1,806,507 | 5/1931 | Smalley | 313/1 |
| 3,554,723 | 1/1971 | Loxley et al. | 65/86 |
| 3,652,248 | 3/1972 | Loxley et al. | 65/108 |
| 3,873,293 | 3/1975 | Rudd et al. | 65/84 |
| 3,911,070 | 10/1975 | Wilson | 65/86 |
| 4,626,397 | 12/1986 | Bose | 264/565 |
| 4,810,458 | 3/1989 | Oshima et al. | 264/555 |
| 5,112,544 | 5/1992 | Misawa et al. | 264/67 |
| 5,407,625 | 4/1995 | Travelute et al. | 264/168 |
| 5,567,493 | 10/1996 | Imai et al. | 428/36.9 |

FOREIGN PATENT DOCUMENTS 4312744  12/1994  Germany.

*Primary Examiner*—Donald E. Czaja
*Assistant Examiner*—Sean Vincent
*Attorney, Agent, or Firm*—Michael I. Kroll

[57] ABSTRACT

An apparatus (10) for extruding glass tubing (12) which comprises a furnace (14). A component (16) within the furnace (14) is for holding molten glass (18). A duplex mandrel (20) on one end of the furnace (14) is connected into the holding component (16). A facility (22) is for forcing the molten glass (18) in the holding component (16) out through the duplex mandrel (20), so as to form the glass tubing (12) having an upper support segment (24) and a lower structural segment (26). An assembly (28) is for quick cooling the upper support segment (24) of the glass tubing (12) upon exiting the duplex mandrel (20), so that the lower structural segment (26) will maintain its desired shape while slow cooling.

18 Claims, 5 Drawing Sheets

METHOD AND APPARATUS FOR EXTRUDING GLASS TUBING

BACKGROUND OF THE INVENTION

1. Field of the Invention

The instant invention relates generally to glass tubes and more specifically it relates to a method and apparatus for extruding glass tubing.

2. Description of the Prior Art

Numerous glass tubes have been provided in prior art. For example, U.S. Pat. No. 1,806,507 to Smalley; U.S. Pat. No. 3,554,723 to Wilson; U.S. Pat. No. 3,652,240 to Loxley et al. and U.S. Pat. No. 3,873,293 to Rudd et al. all are illustrative of such prior art. While these units may be suitable for the particular purpose to which they address, they would not be as suitable for the purposes of the present invention as heretofore described.

SMALLEY, ROBERT C.

DUPLEX VACUUM TUBE LIGHT

U.S. Pat. No. 1,806,507

A duplex vacuum tube comprising two elongated paths enclosed by common internal and external walls. Each of the paths terminating in electrode chambers. The walls of the electrode chambers of each path being independent of the walls of the corresponding electrode chambers of the other path. Each path containing two internal electrodes and a rare gas. One of the paths containing a light emitting substance having color characteristics different from that of the light emitting substance in the other path.

WILSON, RICHARD W.

METHOD AND APPARATUS FOR AIR COOLING GLASS TUBE

U.S. Pat. No. 3,554,723

High velocity air is supplied to a confined space along an extended length of newly formed glass rod or tubing to provide improved controlled cooling rates and thereby permit higher production rates and improved thermal stress control.

LOXLEY, TED A., WEBB, JOHN M., BARBER, WALTER G.

PROCESS FOR REDRAWING SILICA GLASS RODS

U.S. Pat. No. 3,652,248

A process of redrawing a hollow quartz glass rod to close tolerances comprising feeding the rod vertically between motor-driven feed rolls, directing flames radially inwardly against the periphery of the rod to heat the glass to a drawing temperature above 3,000 degrees Fahrenheit and maintaining a tension on the rod to draw it and reduce its diameter at least 70 percent. Jets of cooling air are directed radially inwardly against the periphery of the heated glass about 1 to about 2 inches below the flame and above the zone of constant diameter to reduce the length of the tapered neck substantially and thereby provide better dimensional control.

RUDD, JOHN DUNCAN, DAVIE, MICHAEL HILL, RIGBY, MALCOLM JAMES

METHOD AND APPARATUS FOR PRODUCTION OF GLASS TUBING

U.S. Pat. No. 3,873,293

An apparatus for producing glass tubing by drawing molten glass from an annular opening, at least one air induction device is provided for cooling the hot glass tubing. The air induction device is arranged to induce a flow of atmospheric air by means of a smaller flow of air under pressure and to direct the flow of atmospheric air over the external surface of the hot glass tubing. The air induction device comprises a venturi-shaped nozzle which is disposed substantially coaxially with the path of the hot glass tubing.

SUMMARY OF THE INVENTION

A primary object of the present invention is to provide a method and apparatus for extruding glass tubing that will overcome the shortcomings of the prior art devices.

Another object is to provide a method and apparatus for extruding glass tubing that will produce a fast cooling support section of a glass tube.

An additional object is to provide a method and apparatus for extruding glass tubing in which the method will form a dual extrusion of glass tubing to extend outwardly from a furnace holding molten glass therein.

A further object is to provide a method and apparatus for extruding glass tubing that is simple and easy to use.

A still further object is to provide a method and apparatus for extruding glass tubing that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
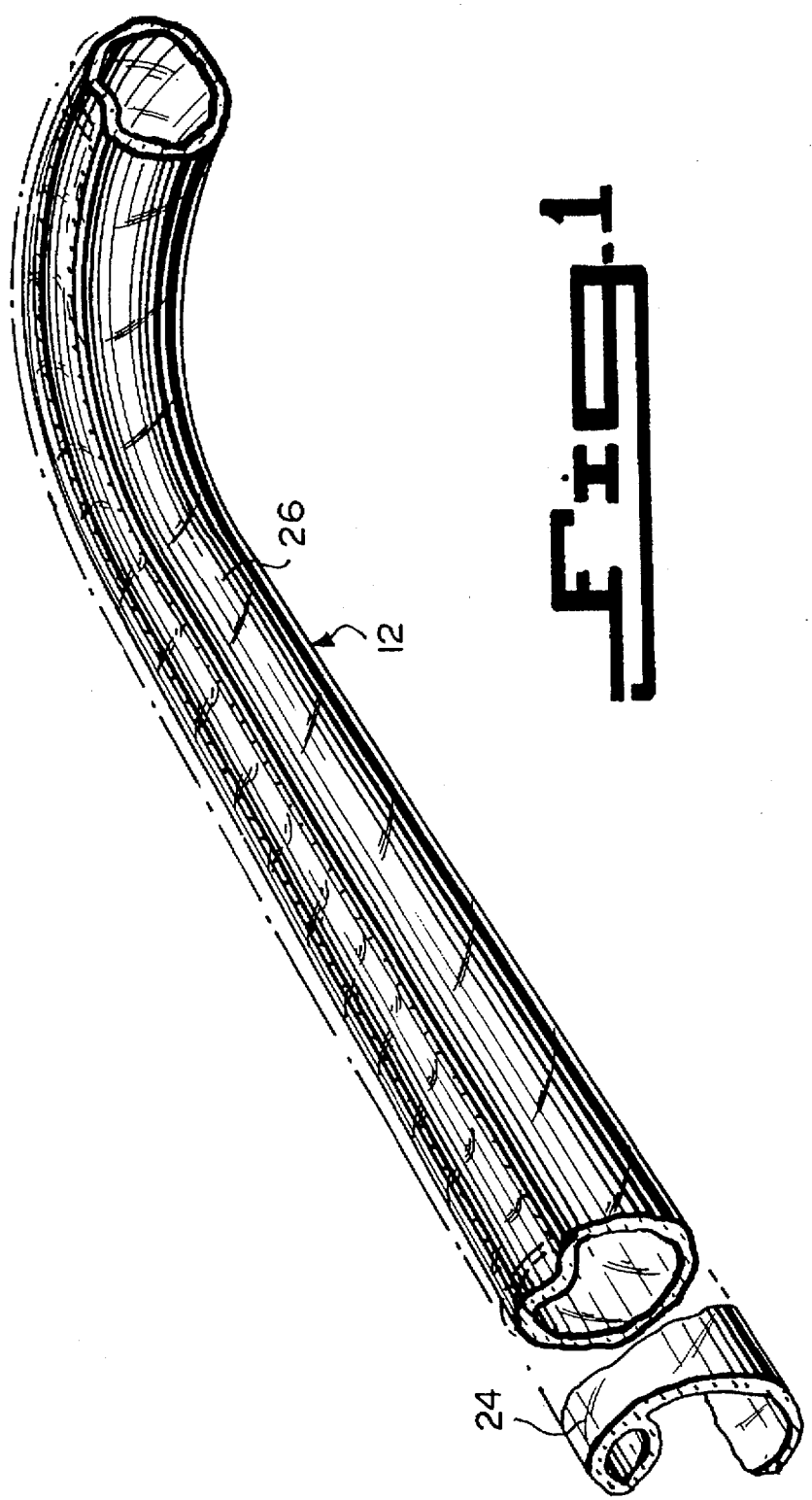
FIG. 1 is a perspective view of a section of glass tubing formed by the instant invention.
Figure 2:
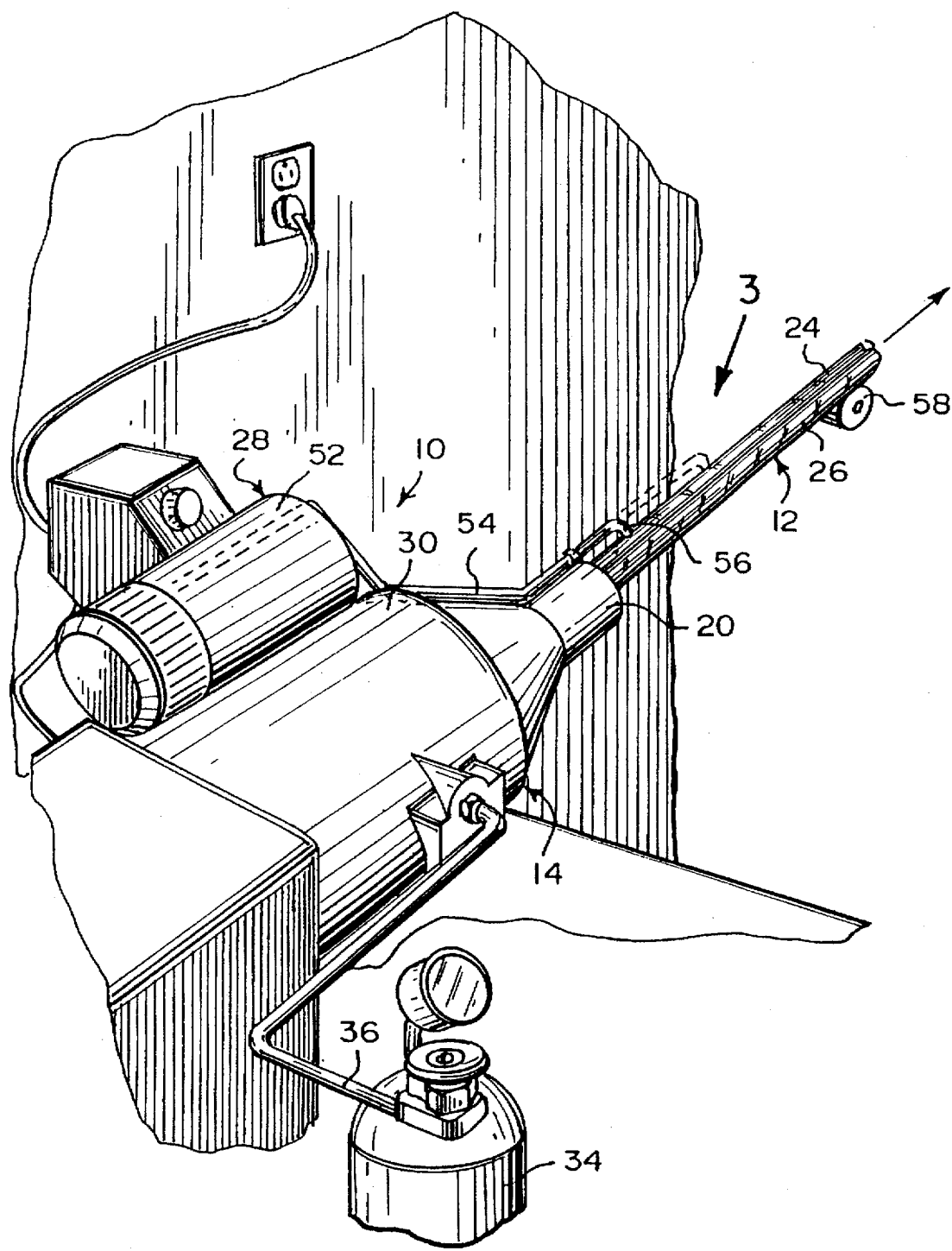
FIG. 2 is a perspective view of the instant invention extruding the glass tubing.
Figure 3:
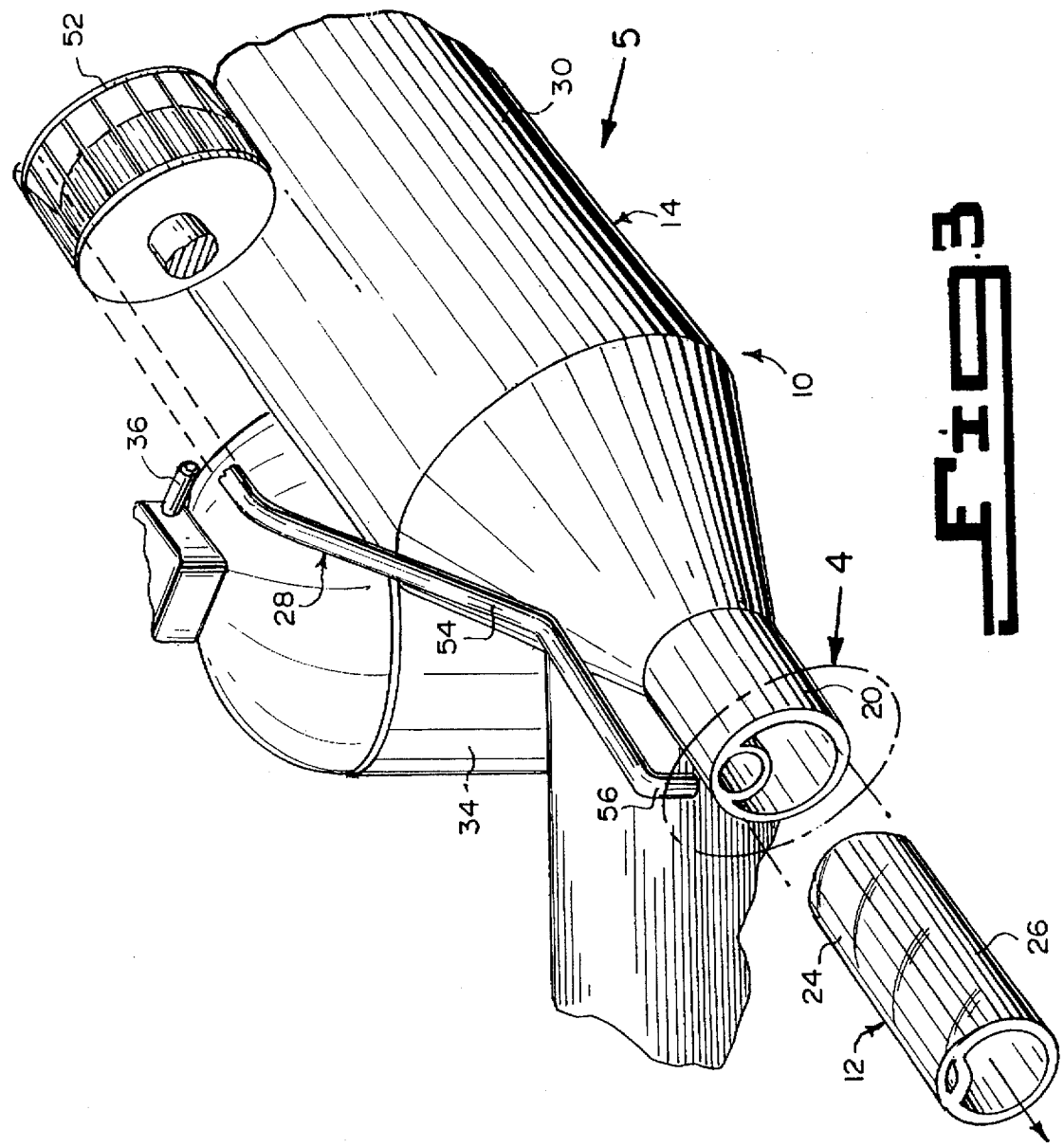
FIG. 3 is a perspective view taken in the direction of arrow 3 in FIG. 2, with parts broken away.
Figure 4:
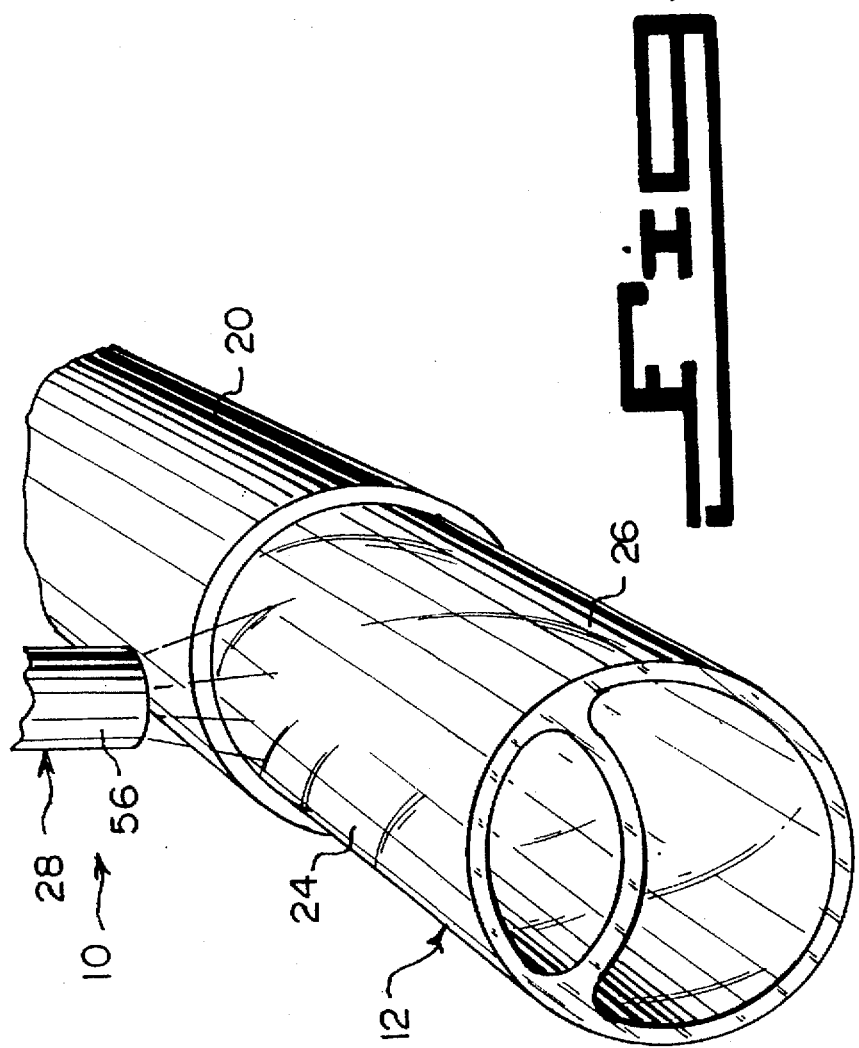
FIG. 4 is an enlarged perspective view of the area indicated by arrow 4 in FIG. 3.

Turning now descriptively to the drawings, in which similar reference characters denote similar elements throughout the several views, FIGS. 1 through 5 illustrate an apparatus 10 for extruding glass tubing 12 which comprises a furnace 14. A component 16 within the furnace 14 is for holding molten glass 18. A duplex mandrel 20 on one end of the furnace 14 is connected into the holding component 16. A facility 22 is for forcing the molten glass 18 in the holding component 16 out through the duplex mandrel 20, so as to form the glass tubing 12 having an upper support segment 24 and a lower structural segment 26. An assembly 28 is for quick cooling the upper support segment 24 of the glass tubing 12 upon exiting the duplex mandrel 20, so that the lower structural segment 26 will maintain its desired shape while slow cooling.

Figure 5:
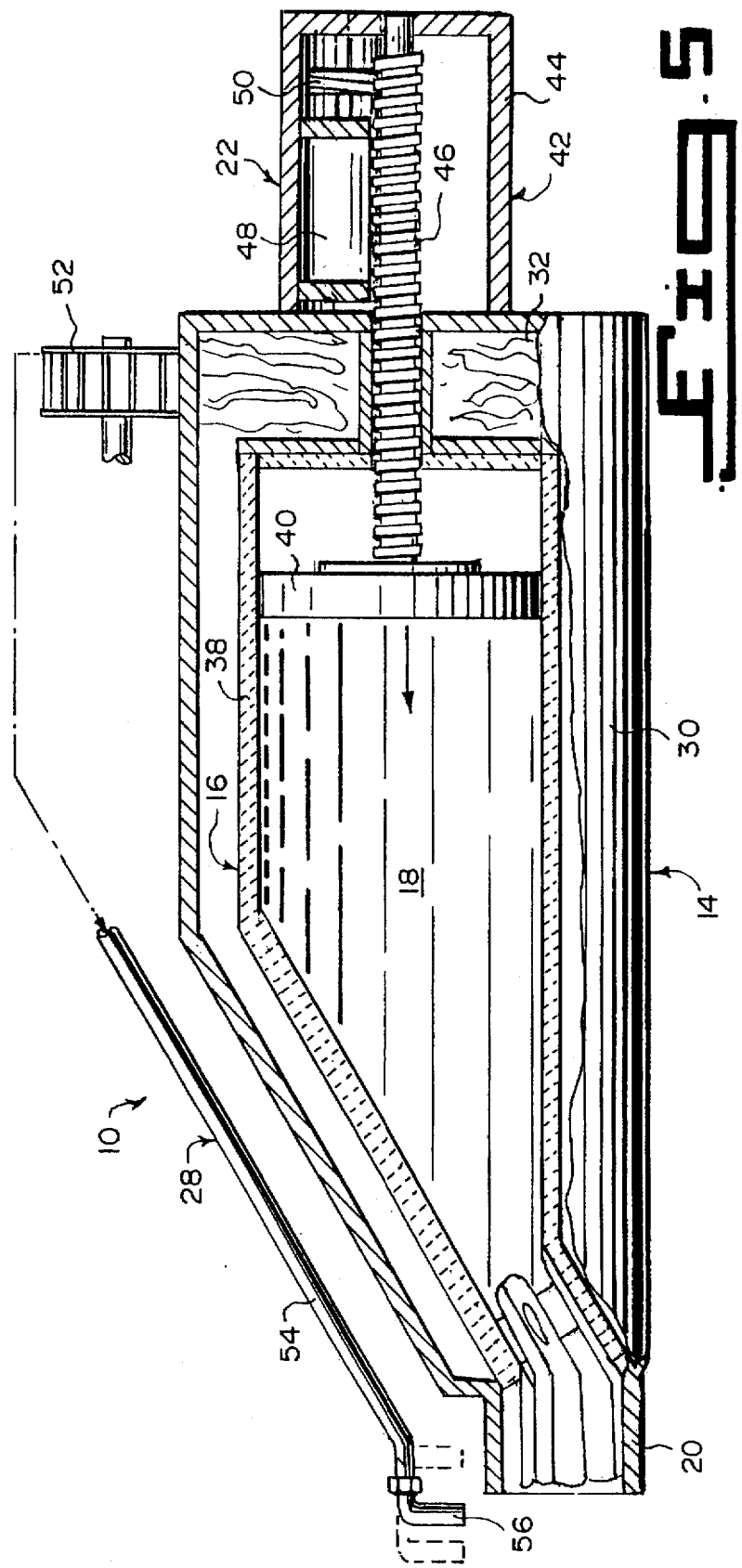
FIG. 5 is a side view taken in the direction of arrow 5 in FIG. 3, with parts shown in cross section.

The furnace 14, as best seen in FIG. 5, includes a housing 30 to encompass the holding component 16. A burner 32 within the housing 30 provides heat for the molten glass 18 in the holding component 16. An external fuel tank 34 is also provided, with a fuel line 36 extending between the external fuel tank 34 and the burner 32. The holding component 16 is a ceramic vessel 38.

The forcing facility 22, as shown in FIG. 5, consists of a pressure plate 40 within the holding component 16 opposite from the duplex mandrel 20. A device 42 is for operating the pressure plate 40, which will push against the molten glass 18 and cause the molten glass 18 to exit the duplex mandrel 20.

The operating device 42 includes a casing 44 affixed to the furnace 14 opposite from the duplex mandrel 20. A threaded drive shaft 46 extends from the casing 44 through the furnace 14 and to the pressure plate 40 within the holding component 16. A motor 48 is carried within the casing 44 adjacent the threaded drive shaft 46. A drive gear 50 is connected to the motor 48 and is in engagement with the threaded drive shaft 46, which will cause the pressure plate 40 to push against the molten glass 18.

The quick cooling assembly 28 comprises a fan 52 to supply air under pressure. A pipe 54 extends from the fan 50 and terminates slightly past and above a forward end of the duplex mandrel 20. An air nozzle 56 is on a distal free end of the pipe 54. The air nozzle 56 is positioned to face downwardly over the upper support segment 24 of the glass tubing 12, after exiting the duplex mandrel 20.

OPERATION OF THE INVENTION

To use the extruding apparatus 10, the following steps should be taken:

1. Holding the molten glass 18 in the ceramic vessel 38 within the furnace 14.
2. Force the molten glass 18 out through the duplex mandrel 20 on the one end of the furnace 14 that is connected into the ceramic vessel 38 by the forcing facility 22, so as to form the glass tubing 12 having the upper support segment and the lower structural segment 26.
3. Quick cool the upper support segment 24 of the glass tubing 12 upon exiting the duplex mandrel 20 by the quick cooling assembly 28, so that the lower structural segment 26 will maintain its desired shape while slow cooling.
4. Allow the glass tubing 12 to continue to travel along a path by riding upon rollers 58.

LIST OF REFERENCE NUMBERS

| 10 | extruding apparatus |
| 12 | glass tubing |
| 14 | furnace of 10 |
| 16 | holding component of 10 |
| 18 | molten glass in 16 |
| 20 | duplex mandrel of 10 |

-continued

LIST OF REFERENCE NUMBERS

| 22 | forcing facility of 10 |
| 24 | upper support segment of 12 |
| 26 | lower structural segment of 12 |
| 28 | quick cooling assembly of 10 |
| 30 | housing of 14 |
| 32 | burner of 14 |
| 34 | external fuel tank of 14 |
| 36 | fuel line of 14 |
| 38 | ceramic vessel for 16 |
| 40 | pressure plate of 22 |
| 42 | operating device of 22 |
| 44 | casing of 42 |
| 46 | threaded drive shaft of 42 |
| 48 | motor of 42 |
| 50 | drive gear of 42 |
| 52 | fan of 28 |
| 54 | pipe of 28 |
| 56 | air nozzle of 28 |
| 58 | roller |

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for extruding glass tubing which comprises:
    a) a furnace;
    b) means within said furnace for holding molten glass;
    c) a duplex mandrel on one end of said furnace connected into said holding means;
    d) means for forcing the molten glass in said holding means out through said duplex mandrel, so as to form the glass tubing having an upper support segment and a lower structural segment; and
    e) means for quick cooling said upper support segment of said glass tubing upon exiting said duplex mandrel, so that said lower structural segment will maintain its desired shape while slow cooling.

2. An apparatus for extruding glass tubing as recited in claim 1, wherein said furnace includes:
    a) a housing to encompass said holding means;
    b) a burner within said housing to provide heat for the molten glass in said holding means;
    c) an external fuel tank; and
    d) a fuel line extending between said external fuel tank and said burner.

3. An apparatus for extruding glass tubing as recited in claim 1, wherein said holding means is a ceramic vessel.

4. An apparatus for extruding glass tubing as recited in claim 1, wherein said forcing means includes:

a) a pressure plate within said holding means opposite from said duplex mandrel; and b) means for operating said pressure plate, which will push against the molten glass and cause the molten glass to exit said duplex mandrel.

5. An apparatus for extruding glass tubing as recited in claim 4, wherein said operating means includes:

a) a casing affixed to said furnace opposite from said duplex mandrel;

b) a threaded drive shaft extending from said casing through said furnace and to said pressure plate within said holding means;

c) a motor carried within said casing adjacent said threaded drive shaft; and d) a drive gear connected to said motor and in engagement with said threaded drive shaft, which will cause said pressure plate to push against the molten glass.

6. An apparatus for extruding glass tubing as recited in claim 1, wherein said quick cooling means includes:

a) a fan to supply air under pressure;

b) a pipe extending from said fan and terminating slightly past and above a forward end of said duplex mandrel; and c) an air nozzle on a distal free end of said pipe, whereby said air nozzle is positioned to face downwardly over said upper support segment of said glass tubing after exiting said duplex mandrel.

7. A method of extruding glass tubing comprising the steps of:

a) holding molten glass in a ceramic vessel within a furnace;

b) forcing the molten glass out through a duplex mandrel on one end of said furnace that is connected into said ceramic vessel, so as to form said glass tubing having an upper support segment and a lower structural segment; and c) quick cooling said upper support segment of said glass tubing upon exiting said duplex mandrel, so that said lower structural segment will maintain its desired shape while slow cooling.

8. A method as recited in claim 7, wherein said furnace includes:

a) a housing to encompass said ceramic vessel;

b) a burner within said housing to provide heat for the molten glass in said ceramic vessel;

c) an external fuel tank; and d) a fuel line extending between said external fuel tank and said burner.

9. A method as recited in claim 7, wherein said step b) includes operating a pressure plate within said ceramic vessel opposite from said duplex mandrel, whereby said pressure plate will push against the molten glass and cause the molten glass to exit said duplex mandrel.

10. A method as recited in claim 7, wherein step c) includes:

a) a fan to supply air under pressure;

b) a pipe extending from said fan and terminating slightly past and above a forward end of said duplex mandrel; and c) an air nozzle on a distal free end of said pipe, whereby said air nozzle is positioned to face downwardly over said upper support segment of said elongate glass tube after exiting said duplex mandrel.

11. An apparatus for extruding glass tubing which comprises:

a) a furnace, wherein said furnace includes a housing to encompass said holding means, a burner within said housing to provide heat for the molten glass in said holding means, an external fuel tank and a fuel line extending between said external fuel tank and said burner;

b) means within said furnace for holding molten glass;

c) a duplex mandrel on one end of said furnace connected into said holding means;

d) means for forcing the molten glass in said holding means out through said duplex mandrel, so as to form the glass tubing having an upper support segment and a lower structural segment; and e) means for quick cooling said upper support segment of said glass tubing upon exiting said duplex mandrel, so that said lower structural segment will maintain its desired shape while slow cooling.

12. An apparatus for extruding glass tubing as recited in claim 11, wherein said holding means is a ceramic vessel.

13. An apparatus for extruding glass tubing as recited in claim 12, wherein said forcing means includes:

a) a pressure plate within said holding means opposite from said duplex mandrel; and b) means for operating said pressure plate, which will push against the molten glass and cause the molten glass to exit said duplex mandrel.

14. An apparatus for extruding glass tubing as recited in claim 13, wherein said operating means includes:

a) a casing affixed to said furnace opposite from said duplex mandrel;

b) a threaded drive shaft extending from said casing through said furnace and to said pressure plate within said holding means;

c) a motor carried within said casing adjacent said threaded drive shaft; and d) a drive gear connected to said motor and in engagement with said threaded drive shaft, which will cause said pressure plate to push against the molten glass.

15. An apparatus for extruding glass tubing as recited in claim 16, wherein said quick cooling means includes:

a) a fan to supply air under pressure;

b) a pipe extending from said fan and terminating slightly past and above a forward end of said duplex mandrel; and c) an air nozzle on a distal free end of said pipe, whereby said air nozzle is positioned to face downwardly over said upper support segment of said glass tubing after exiting said duplex mandrel.

16. A method of extruding glass tubing comprising the steps of:

a) holding molten glass in a ceramic vessel within a furnace, wherein said furnace includes a housing to encompass said ceramic vessel, a burner within said housing to provide heat for the molten glass in said ceramic vessel, an external fuel tank and a fuel line extending between said external fuel tank and said burner;

b) forcing the molten glass out through a duplex mandrel on one end of said furnace that is connected into said ceramic vessel, so as to form said glass tubing having an upper support segment and a lower structural segment; and c) quick cooling said upper support segment of said glass tubing upon exiting said duplex mandrel, so that said lower structural segment will maintain its desired shape while slow cooling.

17. A method as recited in claim 16, wherein said step b) includes operating a pressure plate within said ceramic vessel opposite from said duplex mandrel, whereby said pressure plate will push against the molten glass and cause the molten glass to exit said duplex mandrel.

18. A method as recited in claim 17, wherein step c) includes:

a) a fan to supply air under pressure;

b) a pipe extending from said fan and terminating slightly past and above a forward end of said duplex mandrel; and c) an air nozzle on a distal free end of said pipe, whereby said air nozzle is positioned to face downwardly over said upper support segment of said elongate glass tube after exiting said duplex mandrel.

* * * * *